(12) United States Patent
Gazeau

(10) Patent No.: US 9,291,307 B2
(45) Date of Patent: Mar. 22, 2016

(54) ATTACHMENT OF INSULATING PANELS ONTO A SUPPORTING WALL IN A REPEATING PATTERN

(75) Inventor: James Gazeau, Antony (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 261 days.

(21) Appl. No.: 14/000,951

(22) PCT Filed: Feb. 14, 2012

(86) PCT No.: PCT/FR2012/050314
§ 371 (c)(1), (2), (4) Date: Aug. 22, 2013

(87) PCT Pub. No.: WO2012/117180
PCT Pub. Date: Sep. 7, 2012

(65) Prior Publication Data
US 2013/0326861 A1   Dec. 12, 2013

(30) Foreign Application Priority Data
Mar. 1, 2011   (FR) ...................................... 11 51651

(51) Int. Cl.
| | |
|---|---|
| *B63B 25/16* | (2006.01) |
| *F17C 3/02* | (2006.01) |
| *B63B 3/68* | (2006.01) |
| *F16B 5/06* | (2006.01) |
| *F17C 13/00* | (2006.01) |

(52) U.S. Cl.
CPC ... *F17C 3/02* (2013.01); *B63B 3/68* (2013.01); *B63B 25/16* (2013.01); *F16B 5/0635* (2013.01); *F17C 3/027* (2013.01); *F16B 5/0642* (2013.01); *F17C 2201/0157* (2013.01); *F17C 2201/052* (2013.01); *F17C 2203/0304* (2013.01); *F17C 2203/0631* (2013.01); *F17C 2209/227* (2013.01); *F17C 2209/228* (2013.01); *F17C 2209/232* (2013.01); *F17C 2221/033* (2013.01); *F17C 2223/0161* (2013.01); *F17C 2223/033* (2013.01); *F17C 2260/013* (2013.01); *F17C 2270/0107* (2013.01); *Y10T 29/49948* (2015.01)

(58) Field of Classification Search
CPC ................... Y10T 29/53961; Y10T 29/53978; Y10T 29/49998; Y10T 29/49948; F17C 3/02; F17C 3/06; F17C 3/027; F17C 2203/0631; F17C 2209/227; F17C 2201/0157; F17C 2223/0161; F17C 2221/00; F16B 5/0635; F16B 5/0642
See application file for complete search history.

(56) References Cited

U.S. PATENT DOCUMENTS

| | | | | |
|---|---|---|---|---|
| 4,003,174 | A | * | 1/1977 | Kotcharian ..................... 52/415 |
| 4,050,609 | A | * | 9/1977 | Okamoto et al. ........ 220/560.09 |
| 6,374,761 | B1 | * | 4/2002 | Dhellemmes ................ 114/74 A |
| 7,900,794 | B2 | * | 3/2011 | Dhellemmes et al. ... 220/560.05 |

FOREIGN PATENT DOCUMENTS

| | | |
|---|---|---|
| EP | 0 543 686 | 5/1993 |
| FR | 2 174 703 | 10/1973 |

(Continued)

*Primary Examiner* — David Bryant
*Assistant Examiner* — Jun Yoo
(74) *Attorney, Agent, or Firm* — Notaro, Michalos & Zaccaria P.C.

(57) ABSTRACT

A sealed and insulating tank, notably for liquefied natural gas, includes, a supporting wall with anchor members disposed in a repeated pattern, a sealing barrier in contact with a product contained in the tank and a thermal insulation barrier disposed between the sealing barrier and the supporting wall, the thermal insulation barrier including a plurality of insulating panels disposed in the repeated pattern, each insulating panel being fixed to the supporting wall by an adhesive disposed on a lower surface of the insulating panel and one or more anchor members of the supporting wall each cooperating with a hole passing through the insulating panel. The number of anchor members per insulating panel is in the range 1 to 6, preferably 2 to 3. A method of fixing insulating panels employs a clamping tool.

12 Claims, 5 Drawing Sheets

(56) References Cited

FOREIGN PATENT DOCUMENTS

| FR | 2691520 | 5/1992 |
| FR | 2 691 520 | 11/1993 |
| FR | 2 909 356 | 6/2008 |
| FR | 2909356 | 6/2008 |

* cited by examiner

ATTACHMENT OF INSULATING PANELS ONTO A SUPPORTING WALL IN A REPEATING PATTERN

The invention relates to the field of the fabrication of thermally insulating walls from insulating panels fixed to a supporting wall in a repeated pattern, as well as to constructions employing such thermally insulating walls, notably sealed and thermally insulated tanks intended to contain liquefied natural gas or other hot or cold products.

Insulating walls obtained from prefabricated insulating panels juxtaposed in a repeated pattern are known in methane tanker tanks. Thus FR2691520A1 discloses a thermal insulation system in which rectangular insulating plates and prefabricated angle structures are fixed to a supporting structure by means of screws engaged in holes formed all around the insulating plate or the angle structure. This system necessitates a relatively high number of screws per insulating plate.

FR2909356 discloses a sealed and thermally insulated tank in which insulating blocks are fixed to the internal hull of a ship by beads of mastic disposed on the lower face of their supporting panel and held in contact with the internal hull during their installation by fixing means cooperating with pins fixed to the hull in a repeated pattern. This system necessitates a relatively high number of pins per insulating block to ensure a relatively uniform pressure of the mastic against the internal hull.

One embodiment of the invention provides a method for fixing an insulating panel to a supporting wall in a repeated pattern of insulating panels, the supporting wall being provided with anchor members disposed in said repeated pattern, an insulating panel including each time an adhesive disposed on a lower surface of the insulating panel and a hole passing through the insulating panel, the method including:
disposing a first insulating panel on the supporting wall in such a manner as to press the adhesive against the supporting wall, the hole of the first insulating panel being positioned in line with a first anchor member,
clamping the first insulating panel against the supporting wall with the aid of the first anchor member at the level of the hole,
attaching a clamping tool to at least one second anchor member corresponding to the location of a second insulating panel adjacent the first insulating panel, the clamping tool including an anchor rod adapted to be attached to the anchor members of the supporting wall in such a manner as to project substantially perpendicularly to the supporting wall and an arm connected to the anchor rod transversely thereto to extend at a distance from the supporting wall in the attached position of the clamping tool, and
clamping the first insulating panel against the supporting wall with the arm of the clamping tool in an area of the first insulating panel distant from the hole of the first insulating panel.

In particular embodiments, such a method may have one or more of the following features:

In one embodiment the second insulating panel has not yet been placed on the supporting wall when fixing the first insulating panel, the arm of the clamping tool being brought to bear on the one hand on the first insulating panel and on the other hand on the supporting wall at the level of the location of the second insulating panel.

In one embodiment the method further includes:
removing the clamping tool from the second anchor member after the adhesive on the first insulating panel has been crushed against the supporting wall, to enable placing of the second insulating panel on the supporting wall. The clamping tool may optionally be held in position longer, for example for some or all of the drying time of the adhesive, before being removed from the second anchor member.

In one embodiment a third insulating panel adjacent the first insulating panel has already been disposed on the supporting wall during the fixing of the first insulating panel, the method further including:
attaching a second clamping tool to a third anchor member corresponding to the location of the third insulating panel,
bringing the arm of the second clamping tool to bear on the one hand on the first insulating panel and on the other hand on the third insulating panel, and
clamping the first insulating panel against the supporting wall with the arm of the second clamping tool at the level of a second area of the first insulating panel at a distance from the hole of the first insulating panel.

In one embodiment a surface of the first insulating panel and a surface of the third insulating panel on which the arm of the second clamping tool bears are at the same level relative to the supporting wall.

In another embodiment a surface of the first insulating panel and a surface of the third insulating panel on which the arm of the second clamping tool bears are at different levels relative to the supporting wall. An embodiment of this kind may notably be used with panels having different thicknesses or if the same insulating panel has different thicknesses in different areas of the insulating panel.

In one embodiment, the anchor members include studs projecting from the supporting wall, the method further including:
screwing a nut onto a stud engaged in the hole in the insulating panel to clamp the first insulating panel against the supporting wall at the level of the hole.

In one embodiment, each insulating panel includes a rigid material base plate and a block of insulative material fixed to the base plate, the hole of the insulating panel forming a well through the block of insulating material.

Depending on the size of the insulating panels to be fixed and the intensity of the required clamping forces, such a method may also be implemented with a plurality of holes per insulating panel cooperating with a plurality of corresponding anchor members.

Depending on the size of the insulating panels to be fixed and the intensity of the required clamping forces, such a method may also be implemented using a greater number of clamping tools per insulating panel, for example by employing simultaneously a plurality of clamping tools like the aforementioned first clamping tool and/or by employing simultaneously a plurality of clamping tools like the aforementioned second clamping tool. Where appropriate each clamping tool is employed to clamp a different area of the first insulating panel against the supporting wall in such a manner as to ensure a good contact and good setting of the adhesive against the supporting wall.

If a plurality of clamping tools is employed, such a method may be implemented with the aid of a plurality of types of clamping tool having different dimensions and each being adapted to the dimensions and to the thicknesses of the areas on which the clamping tool is to bear. However, such implementation necessitates the procurement, storage and sorting of a plurality of types of clamping tool, which may complicate the management of a construction site.

Alternatively, a method of this kind may be implemented using a more universal type of clamping tool, having adjustable parts adjustable to suit the different dimensions and the different thicknesses of the areas on which the clamping tool is to bear. A combination of presized clamping tools and adjustable clamping tools is also possible, depending on the requirements of the target application.

A corresponding embodiment of the invention provides a clamping tool suitable for implementing the aforementioned methods, including:

an anchor rod adapted to be attached to the anchor members of the supporting wall in such a manner as to project substantially perpendicularly to the supporting wall, an arm connected to the anchor rod transversely thereto to extend at a distance from the supporting wall in the attached position of the clamping tool, the arm including first and second parts situated on respective opposite sides of the anchor rod, a first bearing member connected in a mobile manner to the first part of the arm and adjustable in position relative to the arm in a direction substantially parallel to the anchor rod so as to be able to be brought to bear on an insulating panel, and a second bearing member connected in a mobile manner to the second part of the arm and adjustable in position relative to the arm in a direction substantially parallel to the anchor rod, wherein the second bearing member has an amplitude of adjustment in position relative to the arm that is greater than the thickness of the insulating panels so as to be able selectively to bring the second bearing member to bear on the supporting wall or on another insulating panel if the first bearing member is bearing on the first insulating panel.

In particular embodiments, such a clamping tool may have one or more of the following features.

In one embodiment, the first bearing member includes a first pad connected to the end of a first adjustment screw, the first adjustment screw being engaged in a threaded hole in the first part of the arm. These arrangements enable continuous adjustment of the position of the first pad to exert a controlled pressure on the insulating panel.

In one embodiment, the second bearing member includes a second pad connected to the end of a second adjustment screw, the second adjustment screw being engaged in a threaded hole in an intermediate rod, the intermediate rod being connected to the second part of the arm in such a manner as to extend parallel to the anchor rod and being adjustable in position relative to the second part of the arm. An adjustable intermediate rod of this kind enables a relatively large amplitude of adjustment of the second pad to be obtained without excessively lengthening the second adjustment screw, which limits the risk of such a screw crossthreading, twisting or binding in use.

In one embodiment, the intermediate rod has a plurality of predetermined adjustment positions relative to the second part of the arm. These arrangements enable a clamping tool to be created adapted to a limited number of predetermined dimensions, for example dimensions of standardized panels, whilst providing relatively fast adjustment of the intermediate rod between the various corresponding positions.

In one embodiment, the intermediate rod has a plurality of holes defining the predetermined adjustment positions relative to the second part of the arm. Such an embodiment is adapted to fix the intermediate rod to the arm by screws, pins or the like.

In one embodiment, the arm is adjustable in position along the anchor rod. Such an adjustment in position may be continuous or between a limited number of predetermined discrete positions.

In one embodiment, the tool includes a locking screw for selectively preventing or allowing sliding of the arm along the anchor rod. Alternatively, this function may be exerted by other locking devices, for example a clamp type solution that is locked by a bracing effect.

In one embodiment, the arm and the anchor rod are articulated to each other by a ball-joint connection.

Another embodiment of the invention also provides a sealed and insulative tank including:

a supporting wall provided with anchor members disposed in a repeated pattern, a sealing barrier adapted to be in contact with a product contained in the tank, and a thermal insulation barrier disposed between the sealing barrier and the supporting wall, the thermal insulation carrier including a plurality of insulating panels disposed in accordance with the repeated pattern, each insulating panel being fixed to the supporting wall by an adhesive disposed on a lower surface of the insulating panel and one or more anchor members of the supporting wall cooperating each time with a hole through the insulating panel, wherein a number of anchor members per insulating panel is in the range 1 to 6 inclusive, preferably 2 to 3 inclusive.

Such a tank may notably be fabricated using a method of fixing insulating panels defined above.

In particular embodiments, such a tank may have one or more of the following features.

In one embodiment, the holes are disposed along the edges of the insulating panels.

In one embodiment, an insulating panel includes a rigid material base plate and a block of insulating material fixed to the base plate opposite the lower surface carrying the adhesive, each hole in the insulating panel including a well passing through the block of insulating material and a bore of smaller diameter than the well produced through the base plate at the bottom of the well to receive the anchor member intended to fix the insulating panel against the supporting wall.

Such a tank may form part of a terrestrial storage installation, for example for storing LNG, or be installed on a coastal or deep water floating structure, notably a methane tanker, a floating storage and regassifaction unit (FSRU), an offshore floating production and storage unit (FPSO), etc.

In one embodiment, a ship for the transport of a cold liquid product includes a double hull and a tank of the aforementioned kind disposed in the double hull. The supporting wall is preferably provided by an internal hull of the double hull.

One embodiment of the invention also provides a method of loading or offloading such a ship, in which a cold liquid product is fed through insulated pipes from or to a floating or terrestrial storage installation to or from the tank of the ship.

One embodiment of the invention also provides a transfer system for a cold liquid product, the system including the aforementioned ship, insulated pipes arranged in such a manner as to connect the tank installed on the hull of the ship to a floating or terrestrial storage installation, and a pump for passing a flow of cold liquid product through the insulated pipes from or to the floating or terrestrial storage installation to or from the tank of the ship.

One basic idea of the invention is to provide reliable bonding of insulating panels to a supporting wall with the aid of a limited number of available anchor points for clamping the insulating panels against the supporting wall.

Some aspects of the invention start from the idea that, in a structure of insulating panels disposed in a repeated pattern, in which anchor members are also disposed in a repeated pattern, the clamping of an insulating panel against the supporting wall may be effected not only from an anchor member or anchor members situated at the location of the panel but also from anchor members situated outside the location of the panel, notably situated at the location of adjacent insulating panels within the repeated pattern.

Some aspects of the invention start from the idea that, to produce reliable bonding of insulating panels to a supporting wall, means for clamping an insulating panel against the supporting wall do not necessarily have to remain permanently in place on the insulating panel. Some aspects of the invention start from the idea that these clamping means may interfere with the placement of other insulating panels remaining to be fitted if those clamping means are employed temporarily for the time of crushing the adhesive of the first panel—and possibly some or all of its drying—and may then be removed to free the locations of the other panels.

The invention will be better understood, and other objects, details, features and advantages thereof will become more clearly apparent, in the course of the following description of a plurality of particular embodiments of the invention, given by way of nonlimiting illustration only, with reference to the appended drawings.

Figure 1:
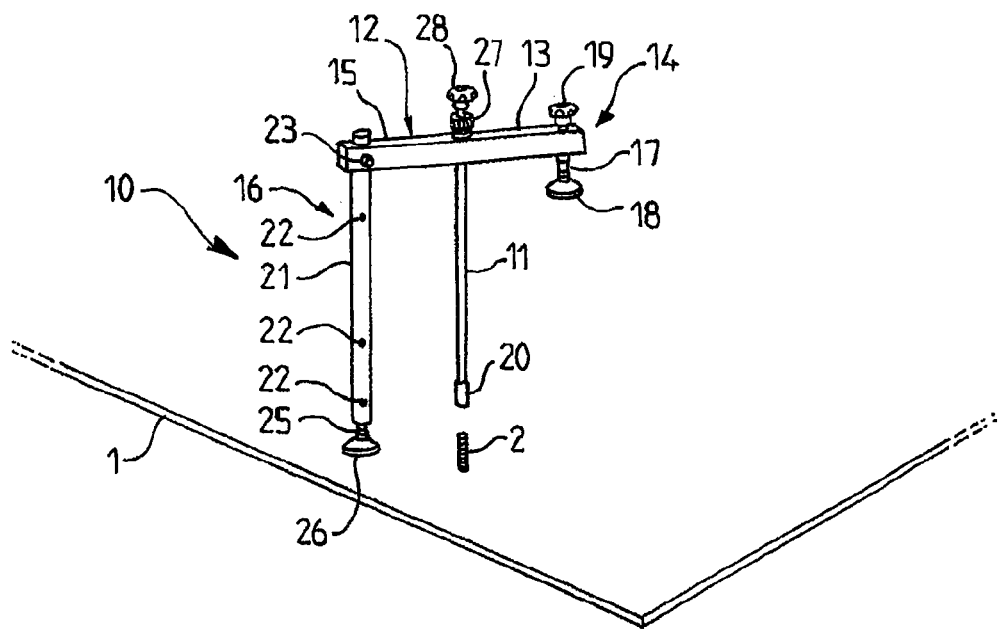
FIG. 1 is a diagrammatic perspective view of a clamping tool of one embodiment adapted to be attached to a supporting wall.

Referring to FIG. 1, an adjustable clamping tool 10 is represented above a wall 1 to which the tool 10 is intended to be attached to be able to clamp diverse objects against the wall 1.

The clamping tool 10 includes an anchor rod 11 one end of which carries an attachment 20 and a transverse arm 12 connected to the anchor rod 11 at an intermediate point of the arm 12 in such a manner as to extend either side of the anchor rod 11. A first part 13 of the arm 12 carries a first adjustable bearing device 14 and a second part 15 of the arm 12 carries a second adjustable bearing device 16.

The first adjustable bearing device 14 includes an adjustment screw 17 engaged in a threaded hole in the arm 12 parallel to the anchor rod 11. The screw 17 has a bearing pad 18 at its end facing toward the attachment 20 and a handle 19 at the opposite end. The handle 19 is used to turn the screw 17 manually to adjust the position of the bearing pad 18 relative to the arm 12. The bearing pad 19 may have a disk or other shape.

The second adjustable bearing device 16 includes an intermediate rod 21 sliding in a hole in the arm 12 parallel to the anchor rod 11. The rod 21 has a plurality of transverse holes 22 situated along its length enabling the intermediate rod 21 to be fixed to the arm 12 in different positions. To this end, the intermediate rod 21 is slid until the corresponding hole 22 is placed at the required position on the arm 12, after which a fixing screw 23 is inserted into and tightened in the arm 12 and in the corresponding hole 22. There are four holes 22 in the FIG. 1 embodiment, the first being concealed by the arm 12.

An adjustment screw 25 is engaged in a threaded hole at the end of the intermediate rod 21 parallel to the anchor rod 11. The screw 25 carries a bearing pad 26 at its end facing toward the attachment 20. The bearing pad 26 may have a disk or other shape.

The rod 11 slides through a ball-joint situated in the central part of the arm 12. The ball-joint may be formed by a flared hole through the arm 12 and/or by intermediate parts accommodated in the arm 12, as in the prior art.

A clamping device including a rotary ring 27 allows selective release or locking of longitudinal sliding of the anchor rod 11 relative to the arm 12. The anchor rod 11 carries a handle 28 at its end opposite the attachment 20 to facilitate manipulation of the rod 11 in rotation or in translation.

The attachment 20 has a shape complementary to an anchor member 2 fixed to the wall 1 where the clamping tool 10 is intended to be used. In the example shown, the anchor member 2 is a stud and the attachment 20 is a corresponding threaded bush. This attachment system consisting of two complementary parts may have the two parts permutated or be provided in some other manner.

The principle of using the clamping tool 10 is to attach the bush 20 to a stud 2 of the wall 1, to bring the pad 18 to bear on the upper surface of an object that it is required to clamp against the wall 1, for example to glue it, and to bring the pad 26 to bear on the surface of the wall 1 or on the upper surface of another object that it is required to clamp against the wall 1, and to exert forces for clamping the pads 18 and 26 against the surfaces on which they bear, in such a manner as to tension the anchor rod 11 between the stud 2 and the transverse arm 12. The clamping tool 10 thus enables, starting from an anchor member 2 fixed to the wall 1, exertion of a pressure on one or more objects in the direction of the wall 1, throughout a circular adjoining area extending around the anchor member 2 and the size of which depends on the length of the arm 12. Where appropriate, the pad 18 is adapted to bear on the thicker of two objects to be clamped against the wall 1.

Figure 2:
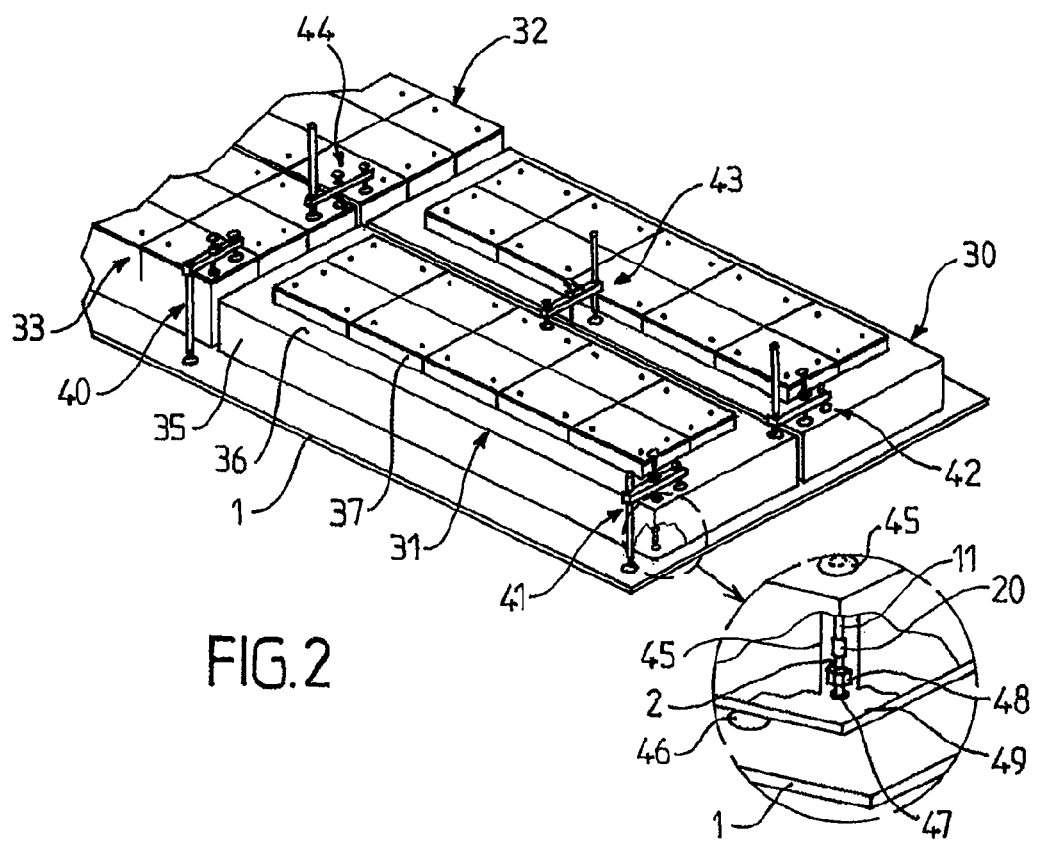
FIG. 2 is a diagrammatic perspective view of an area of insulating wall on which clamping tools from FIG. 1 are mounted in different configurations.
Figure 3:
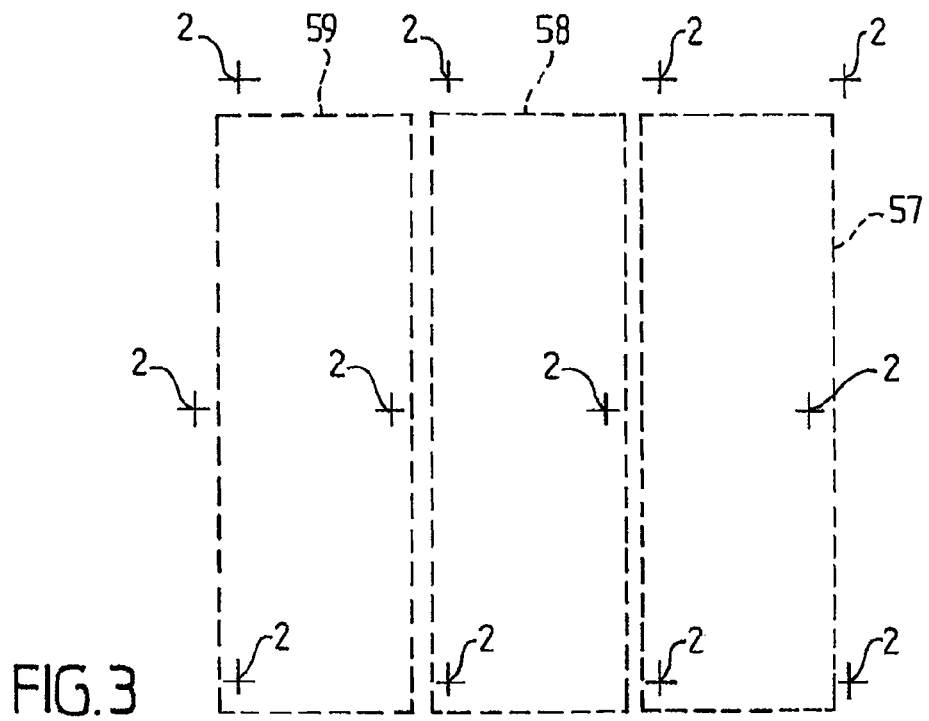
FIGS. 3 to 6 are diagrammatic plan views of an insulating wall showing successive steps of a method of fabricating the insulating wall using clamping tools.

Referring to FIG. 2, there are represented a plurality of examples of the clamping tool used in different configurations for clamping insulation panels 30 to 33 to the wall 1.

The insulating panels 30 and 31 are similar to prefabricated structures described in the document FR2691520A1, which include a secondary insulation barrier element 35 covered with a secondary sealing barrier element 36 covered with a primary insulation barrier element 37 of smaller section than the first two elements. The insulating panels 32 and 33 are simpler structures having a uniform thickness throughout their section.

The method of fixing the panels 30 to 33 to the wall 1 is represented by the enlarged cutaway detail view of the panel 31. At different points of the panel, here in the vicinity of a corner, holes are provided that each include a hole 47 made in the plywood base plate 49 of the panel 31 and a chimney 45 made in the block of insulating foam in line with the hole 47. A stud 2 is engaged through the hole 47 and projects into the base of the chimney 45 where it is capped by a nut 48 providing a secure fixing of the base plate 49 relative to the stud 2. The stud 2 has an end portion that projects from the nut 48 and that is able to receive the fixing bush 20 when it is required to attach the clamping tool 10 to this location, the anchor rod 11 then being engaged in the chimney 45. Moreover, the panel 31 is glued to the wall 1 by means of beads of polymerizable mastic 46 applied by the known technique, for example in wavy or straight parallel lines.

The clamping tools 40 to 44 in FIG. 2 are all attached to the wall 1 in the same way, but differ in terms of their use and their corresponding configuration.

The clamping tool 40 bears on the one hand on the upper surface of the panel 33 and on the other hand on the surface of the wall 1. To this end, the intermediate rod 21 is adjusted to its maximum length, the screw 23 being at the level of the first hole 22 as in FIG. 1. The anchor rod 11 is also adjusted to its maximum length. It is attached to a stud 2 situated at a corner of the panel 33.

The clamping tool 44 bears on the one hand on the upper surface of the panel 33 and on the other hand on the upper surface of the panel 32. To this end, the intermediate rod 21 is adjusted to its minimum length, the screw 23 being in the fourth hole 22 seen in FIG. 1. The anchor rod 11 is still adjusted to its maximum length. It is attached to a stud 2 situated at an opposite corner of the panel 33.

The clamping tool 43 bears on the one hand on the upper surface of the primary insulation barrier 37 of the panel 31 and on the other hand on the upper surface of the secondary sealing barrier 36 of the panel 30. To this end, the intermediate rod 21 is adjusted to an intermediate length, the screw 23 being in the third hole 22 visible in FIG. 1. The anchor rod 11 is still adjusted to its maximum length. It is attached to a stud 2 situated halfway along the edge of the panel 31.

The clamping tool 42 bears on the upper surface of the secondary sealing barrier 36 of the panel 31 and of the panel 30. To this end, the anchor rod 11 is adjusted to a shorter length, to lower the arm 12 by an amount substantially equal to the thickness of the primary insulation barrier 37 relative to the previous adjustment. It is attached to a stud 2 situated at one corner of the panel 30. The intermediate rod 21 is adjusted to its minimum length, the screw 23 being in the fourth hole 22 visible in FIG. 1.

The clamping tool 41 bears on the one hand on the upper surface of the secondary sealing barrier 36 of the panel 31 and on the other hand on the surface of the wall 1. To this end, the anchor rod 11 remains in its previous adjustment. It is attached to a stud 2 situated at a corner of the panel 31. The intermediate rod 21 is adjusted to an intermediate length, the screw 23 being in the second hole 22 visible in FIG. 1.

FIG. 2 is intended only to illustrate concisely various possible uses of the adjustable clamping tool 10 to produce insulating walls from different types of insulating panels. To fabricate an insulating wall from insulating panels of this type, for example for a tank for storing LNG at −163° C., it is in practice necessary to juxtapose a great number of panels like the panel 30 or the panel 32. Thus FIG. 2 gives only a very partial idea of such a tank wall, the general structure of which is moreover known.

The examples of clamping represented in FIG. 2 could be obtained with simpler tools, for example with no possibility of adjustment of the intermediate rod 21 and/or the anchor rod 11. In this case, five different types of tools would be necessary to effect the clamping in the five configurations shown.

One advantage resulting from the use of the aforementioned clamping tools, whether adjustable or not, relates to the possibility of clamping an insulating panel using anchor member situated at the location of an adjacent panel. This possibility enables a panel to be stuck with clamping of good quality and good uniformity employing a limited number of anchor members per insulating panel. Once the glue has set, the fixing of the panel by nuts 48 or the like at the level of the anchor members is not really necessary, except to guard against failure of sticking, for example in the event of atypical heating of the wall resulting from a fire or other cause. To prevent complete detachment of the insulating panels in such a case, a small number of anchor members may be sufficient for each panel, or even only one anchor member per panel. This leads to the possibility of producing an insulating wall, for example in a liquefied gas storage tank, on a supporting wall having a relatively small number of anchor members. The result of this is to simplify and to reduce the cost of producing the supporting wall.

This fact is illustrated in FIGS. 3 to 6 which represent a method of mounting insulating panels on a supporting wall 1 having two studs 2 per panel.

FIGS. 3 to 6 show a supporting wall in plan view provided with studs 2 symbolized by crosses. This wall is intended to receive identical rectangular insulating panels which must be stuck to the supporting wall in a regular repeated pattern. The locations 57, 58, and 59 of three of these panels are represented in dashed line in FIG. 3. The studs 2 are disposed on the supporting wall in a regular repeated pattern corresponding to the dimensions of the panels to be fixed, at the rate of two studs per insulating panel location.

Figure 4:
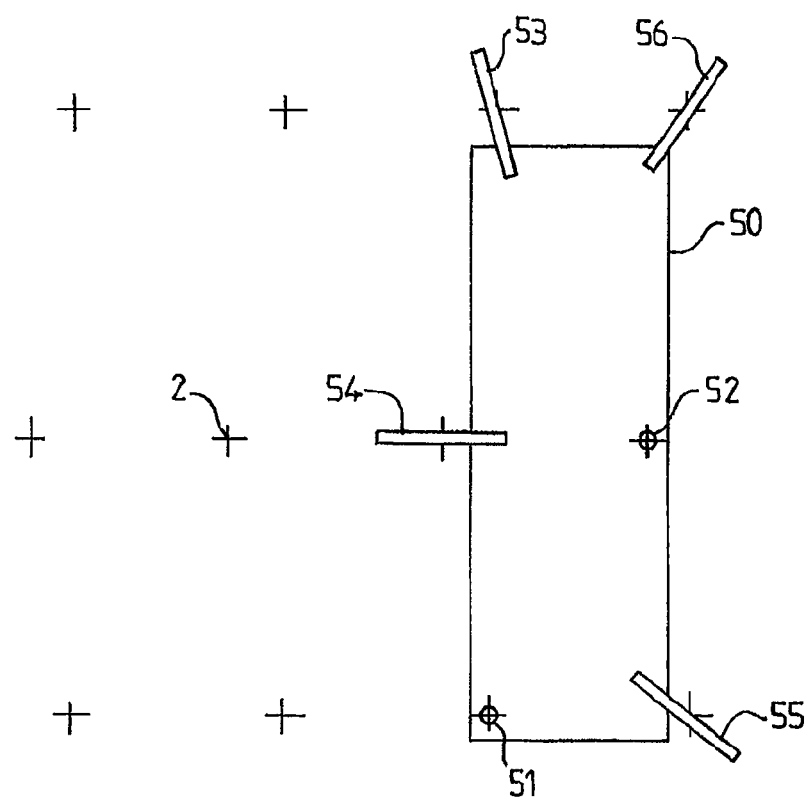

FIG. 4 shows the mounting of the first panel 50. The lower face of the panel 50, not visible in FIGS. 3 to 6, is coated beforehand with an appropriate adhesive, for example beads of polymerizable mastic, notably polyurethane resin or another more flexible resin. The panel 50 comprises two holes 51 and 52, one at the bottom lefthand corner and the other halfway along the righthand side, each of which receives one of the studs 2 of the location 57. Once the studs 2 have been engaged in the holes 51 and 52, nuts or like retaining means are fitted to the studs 2 to retain the panel 50 on the wall, for example in the manner of the nut 48 in FIG. 2.

Because of the small number of studs 2 cooperating directly with the panel 50 and their low-density distribution, these studs 2 are not sufficient to produce relatively uniform clamping of all of the lower surface of the panel 50 to the wall. To this end, clamping tools 53 to 56 are used in addition to the aforementioned nuts. The clamping tools are for example similar to the tool 10 described with reference to FIG. 1.

At this stage, no other panel having yet been mounted on the wall, the clamping tools 53 to 56 are each brought to bear on the supporting wall and on the upper surface of the panel 50 in an analogous manner to the tool 41 or 40 from FIG. 2. The tools 53 to 56 clamp the panel 50 against the wall for the time necessary for correct and sufficiently uniform crushing of the polymerizable resin, notably in the areas of the panel 50 where there are no studs 2. To this end, the tools 53 to 56 are each time attached to studs 2 situated at the locations of the panels adjoining the panel 50.

Figure 5:
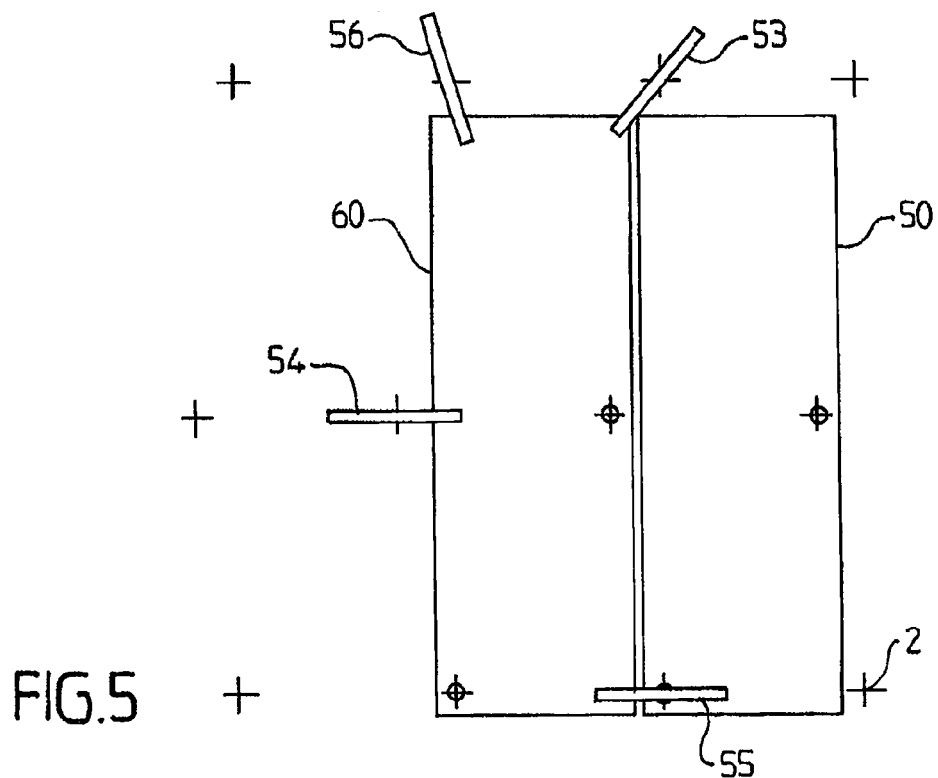

FIG. 5 shows the mounting of a second panel 60 adjacent the first panel 50. The tool 54 is first detached from the wall to free the location 58 where the panel 60 must be placed. The panel 60 is then fixed in the same manner as the panel 50, subject to a few differences as to the placement of the clamping tools 53 to 56. As may be seen in FIG. 5, the tool 54 is simply shifted one position relative to FIG. 4 and used in the same manner. It may therefore remain in the same adjustment position, where appropriate. The tool 53 may remain attached to the same stud 2, the transverse arm simply being turned so as to bear on the upper surface of the panel 60. It may therefore remain in the same adjustment position, where appropriate. The tool 56 is shifted by two positions to assume a configuration relative to the panel 60 that is identical to that of the tool 53 relative to the panel 50 in FIG. 4. It may therefore remain in the same adjustment position, where appropriate. The tool 55 is shifted one position relative to FIG. 4, but now bears on the upper surface of the panels 50 and 60, in the manner of the tool 42, 43 or 44 from FIG. 2. Its adjustment position must therefore be modified, where appropriate, or another tool must be used in the case of tools that are not adjustable.

Figure 6:
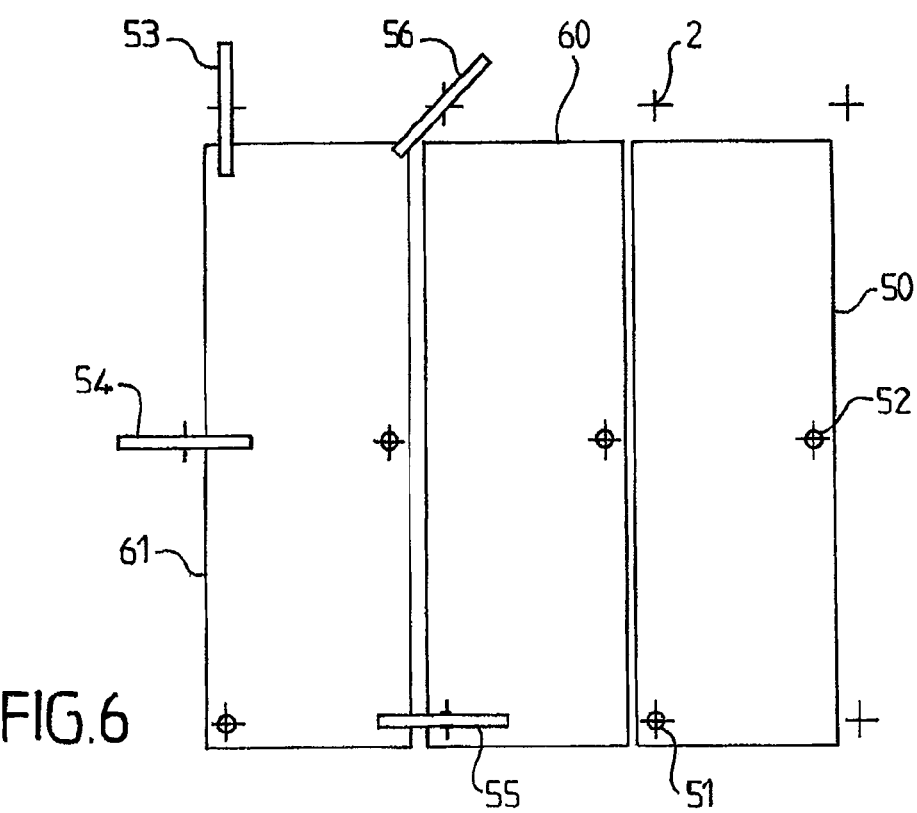

As may be seen in FIG. 6, the third panel 61 is fixed in the same manner by shifting the clamping tools again.

When the insulating wall has been completed in this way, all of the panels being stuck satisfactorily, all the clamping tools may be detached from the supporting wall, where appropriate to enable a subsequent construction phase, for example the placement of a sealing barrier covering the insulating wall to form a sealed tank, using the known technique.

Generally speaking, the clamping tools may be removed from a panel as soon as the mastic has been crushed correctly, that is to say when the panel is in contact with reference shims disposed on the wall and aligned with the adjacent panels.

Figure 7:
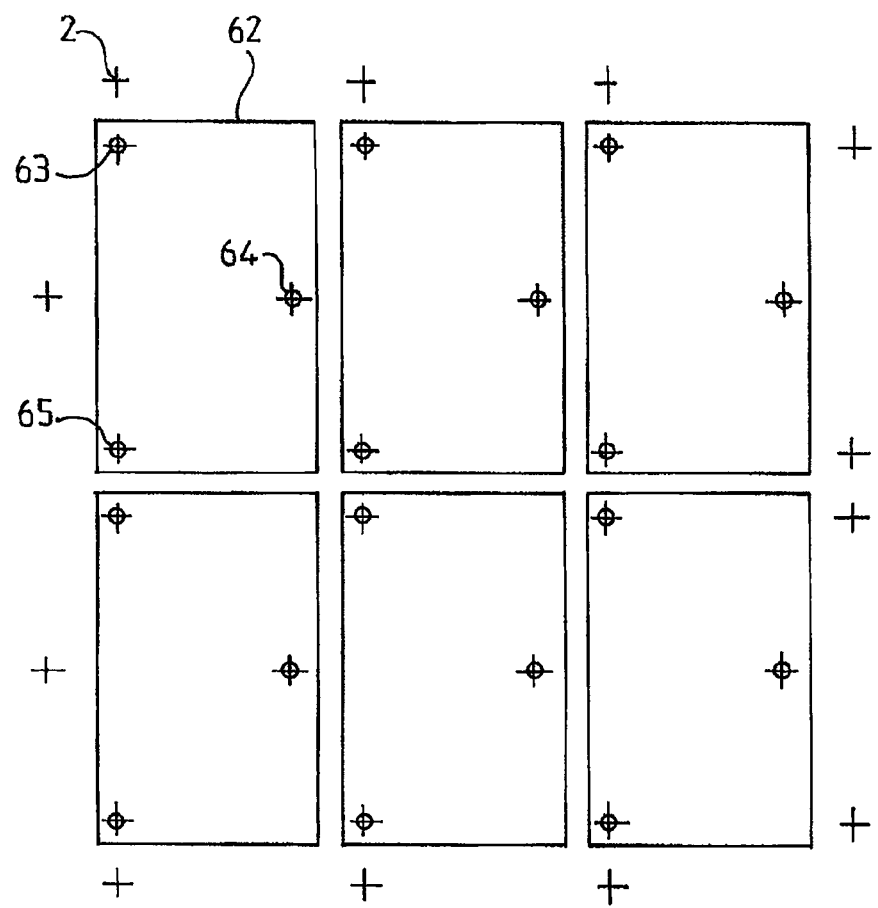
FIG. 7 is a diagrammatic plan view of an insulating wall of another embodiment.

FIG. 7 shows another insulating wall structure that may be produced in a similar manner. In this case, the insulating panels 62 are provided with three holes 63, 64 and 65 to receive three studs 2 of the supporting wall. Other embodiments may be designed by varying in particular the number of studs per panel, the shape of the panels, the pattern in which the panels are laid out and the pattern in which the anchor members of the wall are laid out.

The technique described above for producing an insulating wall may be used in different types of tanks, for example to constitute the thermal insulation barrier or barriers of an LNG tank in a terrestrial installation or on a floating structure such as methane tanker, etc.

For example, in a methane tanker tank produced using the Mark III® technology of the applicant, or in a terrestrial storage tank for LNG produced using the GST® technology of the applicant, the insulating panels may typically have dimensions of 1 m by 3 m.

Figure 8:
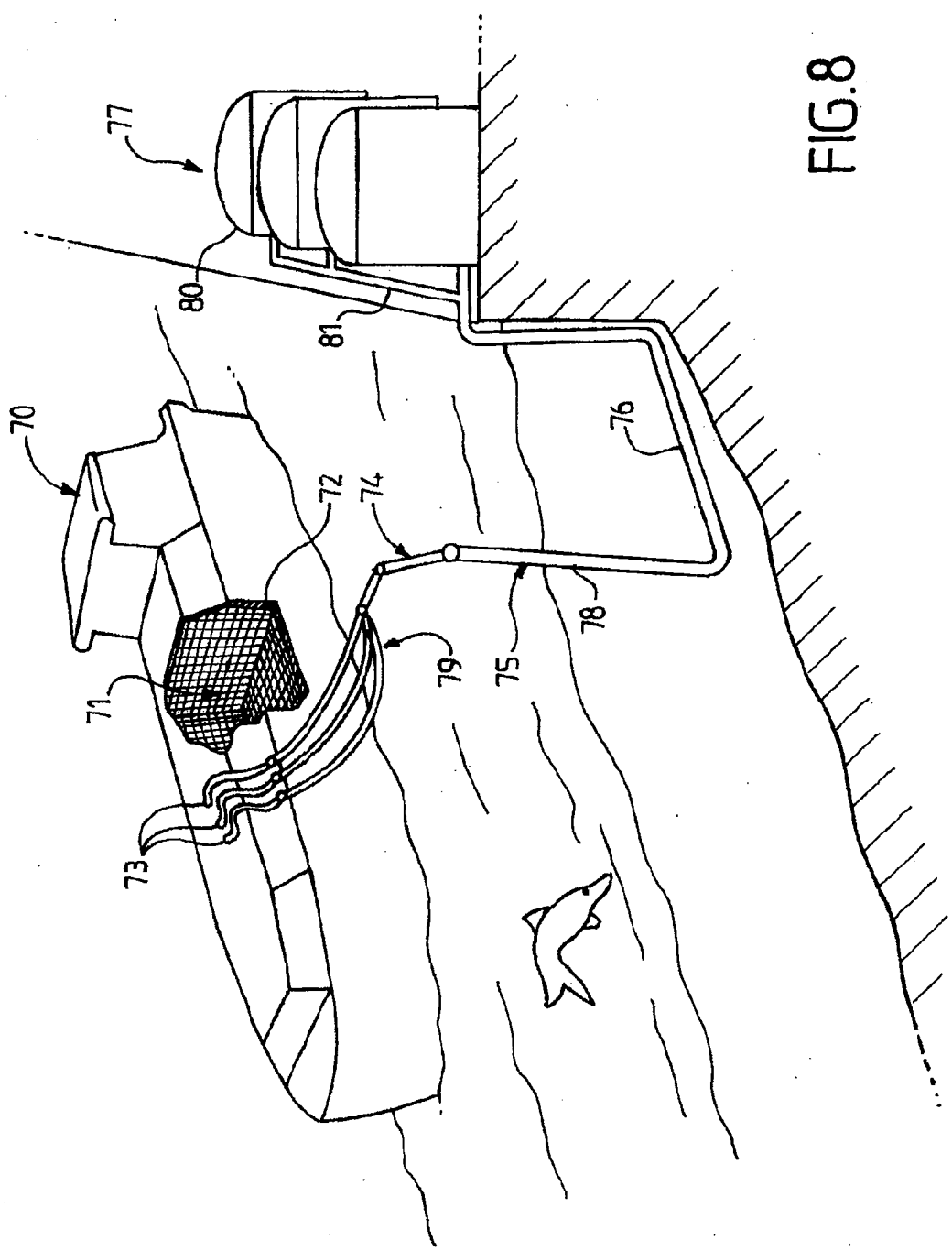
FIG. 8 is a diagrammatic cutaway representation of a methane tanker tank including an insulating wall and of a terminal for loading/offloading that tank.

Referring to FIG. 8, a cutaway view of a methane tanker 70 shows a sealed and insulated tank 71 of prismatic general shape mounted in the double hull 72 of the ship. The wall of the tank 71 includes a primary sealed barrier intended to be in contact with the LNG contained in the tank, a secondary sealing barrier disposed between the primary sealing barrier and the double hull 72 of the ship, and two insulating barriers respectively between the primary sealing barrier and the secondary sealing barrier and between the secondary sealing barrier and the double hull 72.

In a manner that is known in itself, loading/offloading pipes 73 disposed on the top deck of the ship may be connected by means of appropriate connectors to a maritime or port terminal to transfer a cargo of LNG from or to the tank 71.

FIG. 8 represents an example of a maritime terminal including a loading and offloading station 75, an underwater pipe 76 and a land installation 77. The loading and offloading station 75 is a fixed off-shore installation including a mobile arm 74 and a tower 78 that supports the mobile arm 74. The mobile arm 74 carries a bundle of insulated flexible pipes 79 adapted to be connected to the loading/offloading pipes 73. The orientable mobile arm 74 adapts to all methane tanker profiles. A connecting pipe that is not shown extends inside the tower 78. The loading and offloading station 75 enables loading and offloading of the methane tanker 70 from or to the land installation 77. The latter includes liquefied gas storage tanks 80 and connecting pipes 81 connected by the underwater pipe 76 to the loading or offloading station 75. The underwater pipe 76 enables transfer of liquefied gas between the loading or unloading station 75 and the land installation 77 over a great distance, for example 5 km, which makes it possible for the methane tanker 70 to remain at a great distance from the coast during loading and offloading operations.

Pumps onboard the ship 70 and/or pumps equipping the land installation 77 and/or pumps equipping the loading and offloading station 75 are used to generate the pressure necessary to transfer the liquefied gas.

Although the invention has been described with reference to a plurality of particular embodiments, it is obvious that it is in no way limited to them and that it encompasses all technical equivalents of the means described and the combinations thereof if they are within the scope of the invention.

Use of the verbs "include", "comprise" and their conjugate forms does not exclude the presence of elements or other steps than those stated in a claim. The use of the indefinite article "a" or "an" for an element or a step does not exclude the presence of a plurality of such elements or steps unless the contrary is specifically mentioned.

In the claims, reference signs in parentheses must not be interpreted as a limitation of the claim.

The invention claimed is:

1. Method for fixing an insulating panel (50, 60) to a supporting wall in a repeated pattern of insulating panels (50, 60, 61), the supporting wall being provided with anchor members (2) disposed in said repeated pattern, said insulating panel including each time an adhesive disposed on a lower surface of the insulating panel and a hole (51, 52) passing through the insulating panel, the method including:
  disposing a first insulating panel (50, 60) on the supporting wall in such a manner as to press the adhesive against the supporting wall, the hole of the first insulating panel being positioned in line with a first anchor member,
  clamping the first insulating panel against the supporting wall with the aid of the first anchor member (2) at the level of the hole (51, 52),
  attaching a clamping tool (54) to a second anchor member corresponding to the location (58, 59) of a second insulating panel adjacent the first insulating panel, the clamping tool including an anchor rod (11) adapted to be attached to the anchor members of the supporting wall in such a manner as to project substantially perpendicularly to the supporting wall and an arm (12) connected to the anchor rod transversely thereto to extend at a distance from the supporting wall in the attached position of the clamping tool,
  clamping the first insulating panel (50, 60) against the supporting wall with the arm of the clamping tool (54) in an area of the first insulating panel distant from the hole (51, 52) of the first insulating panel, and wherein the second insulating panel (60, 61) has not yet been placed on the supporting wall when fixing the first insulating panel (50), the arm of the clamping tool (54) being brought to bear on the one hand on the first insulating panel (50) and on the other hand on the supporting wall at the level of the location (58) of the second insulating panel.

2. Method according to claim 1, further including: removing the clamping tool (54) from the second anchor member after the adhesive on the first insulating panel has been crushed against the supporting wall, to enable placing of the second insulating panel (60) on the supporting wall.

3. Method according to claim 1, wherein a third insulating panel (50) adjacent the first insulating panel (60) is already disposed on the supporting wall during the fixing of the first insulating panel (60), the method further including:
  attaching a second clamping tool (55) to a third anchor member corresponding to the location of the third insulating panel (50),
  bringing an arm of the second clamping tool to bear on the first insulating panel (60) and on the third insulating panel (50), and
  clamping the first insulating panel (60) against the supporting wall with the arm of the second clamping tool (55) at the level of a second area of the first insulating panel (60) at a distance from the hole of the first insulating panel.

4. Method according to claim 3, wherein a surface of the first insulating panel (32) and a surface of the third insulating panel (33) on which the arm of the second clamping tool (44) bears are at the same level relative to the supporting wall (1).

5. Method according to claim 3, wherein a surface of the first insulating panel (31) and a surface of the third insulating panel (30) on which the arms of the second clamping tool (43) bear are at different levels relative to the supporting wall (1).

6. Method according to claim 1, wherein the anchor members include studs (2) projecting from the supporting wall, the method further including:
    screwing a nut (48) onto a stud to clamping the first insulating panel (31) against the supporting wall at the level of the hole (45, 47).

7. Method for fixing an insulating panel (50, 60) to a supporting wall in a repeated pattern of insulating panels (50, 60, 61), the supporting wall being provided with anchor members (2) disposed in said repeated pattern, said insulating panel including each time an adhesive disposed on a lower surface of the insulating panel and a hole (51, 52) passing through the insulating panel, the method including:
    disposing a first insulating panel (50, 60) on the supporting wall in such a manner as to press the adhesive against the supporting wall, the hole of the first insulating panel being positioned in line with a first anchor member,
clamping the first insulating panel against the supporting wall with the aid of the first anchor member (2) at the level of the hole (51, 52),
    attaching a clamping tool (54) to a second anchor member corresponding to the location (58, 59) of a second insulating panel adjacent the first insulating panel, the clamping tool including an anchor rod (11) adapted to be attached to the anchor members of the supporting wall in such a manner as to project substantially perpendicularly to the supporting wall and an arm (12) connected to the anchor rod transversely thereto to extend at a distance from the supporting wall in the attached position of the clamping tool,
    clamping the first insulating panel (50, 60) against the supporting wall with the arm of the clamping tool (54) in an area of the first insulating panel distant from the hole (51, 52) of the first insulating panel,
wherein the clamping tool (10) that is used includes:
    an anchor rod (11) adapted to be attached to the anchor members (2) of the supporting wall (1) in such a manner as to project substantially perpendicularly to the supporting wall,
    said arm (12) connected to the anchor rod transversely thereto to extend at a distance from the supporting wall in the attached position of the clamping tool, the arm including first and second parts (13, 15) situated on respective opposite sides of the anchor rod,
    a first bearing member (14) connected in a mobile manner to the first part of the arm and adjustable in position relative to the arm in a direction substantially parallel to the anchor rod so as to be able to be brought to bear on an insulating panel, and
    a second bearing member (16) connected in a mobile manner to the second part of the arm and adjustable in position relative to the arm in a direction substantially parallel to the anchor rod,
    wherein the second bearing member (16) has an amplitude of position adjustment relative to the arm greater than the thickness of the insulating panels (30-33) to be able to bring the second bearing member to bear selectively on the supporting wall (1) or on another insulating panel (33) when the first bearing member is bearing on the first insulating panel (33, 32).

8. Method according to claim 7, wherein the first bearing member (14) includes a first pad (18) connected to an end of a first adjustment screw (17), the first adjustment screw being engaged in a threaded hole in the first part of the arm (13).

9. Method according to claim 7, wherein the second bearing member (16) includes a second pad (26) connected to an end of a second adjustment screw (25), the second adjustment screw being engaged in a threaded hole in an intermediate rod (21), the intermediate rod being connected to the second part of the arm (15) in such a manner as to extend parallel to the anchor rod and being adjustable in position relative to the second part of the arm.

10. Method according to claim 9, wherein the intermediate rod (21) has a plurality of predetermined adjustment positions (22) relative to the second part of the arm.

11. Method according to claim 7, wherein the arm (12) is adjustable in position along the anchor rod (11).

12. Method according to claim 7, wherein the arm (12) and the anchor rod (11) are articulate.

\* \* \* \* \*